April 23, 1963  A. P. EFFENY  3,086,819
VEHICLE SEAT STRUCTURE
Filed May 3, 1960  2 Sheets-Sheet 1

ALLAN P. EFFENY
INVENTOR.

BY John R. Faulkner
John J. Roethel
ATTORNEYS

April 23, 1963   A. P. EFFENY   3,086,819
VEHICLE SEAT STRUCTURE

Filed May 3, 1960   2 Sheets-Sheet 2

ALLAN P. EFFENY
INVENTOR.

BY John R. Faulkner
John J. Roethel

ATTORNEYS

United States Patent Office 3,086,819
Patented Apr. 23, 1963

3,086,819
VEHICLE SEAT STRUCTURE
Allan P. Effeny, Upminster, Essex, England, assignor to Ford Motor Company, Dearborn, Mich., a corporation of Delaware
Filed May 3, 1960, Ser. No. 26,532
6 Claims. (Cl. 297—460)

This invention relates to seats, especially for motor vehicles, and more particularly to a seat back construction.

In order to minimize fatigue arising from long periods of sitting in a motor vehicle, it is necessary to provide cushioned support to the small of the back to prevent excessive curvature of the lower spine.

In accordance with the invention, a seat back for a motor vehicle seat is formed of a seat back frame which may be resiliently secured to a seat frame or to be partly integral with a seat frame. The seat back frame consists of substantially rigid generally vertical side frame members linked by upper and lower transverse frame members, the side frame members being forwardly bowed from the transverse frame members to a point corresponding generally to hip height for a person in the vehicle seat. The side frame members are linked by a series of transverse resilient back support members, whereby a resilient convexity in the region of the small of the back is achieved.

Preferably, at least some of the transverse back support members are linked to the upper and lower transverse frame members and each of them is interlinked at least with adjacent back support members.

Thus, by varying the tensions, lengths and arrangements of the transverse back support members a lateral concavity may be obtained, superimposed on the over-all convexity, to provide support during transverse accelerations of the vehicle.

In the preferred form of the invention the seat back comprises an auxiliary frame resiliently supported on a more substantial seat back main frame. Preferably, the auxiliary seat back frame is supported on tubular rubber or like supports having their axes running transversely of the main frame, the tubular supports being mounted between plates on the auxiliary seat back frame and the main seat frame. Such a support provides vertical resilience so that the auxiliary seat back moves with the back of the person seated on the seat during vertical movements of the vehicle.

Other objects, advantages and features of the present invention will be made more apparent as this description proceeds, particularly when considered in connection with the accompanying drawings wherein.

Figure 1:
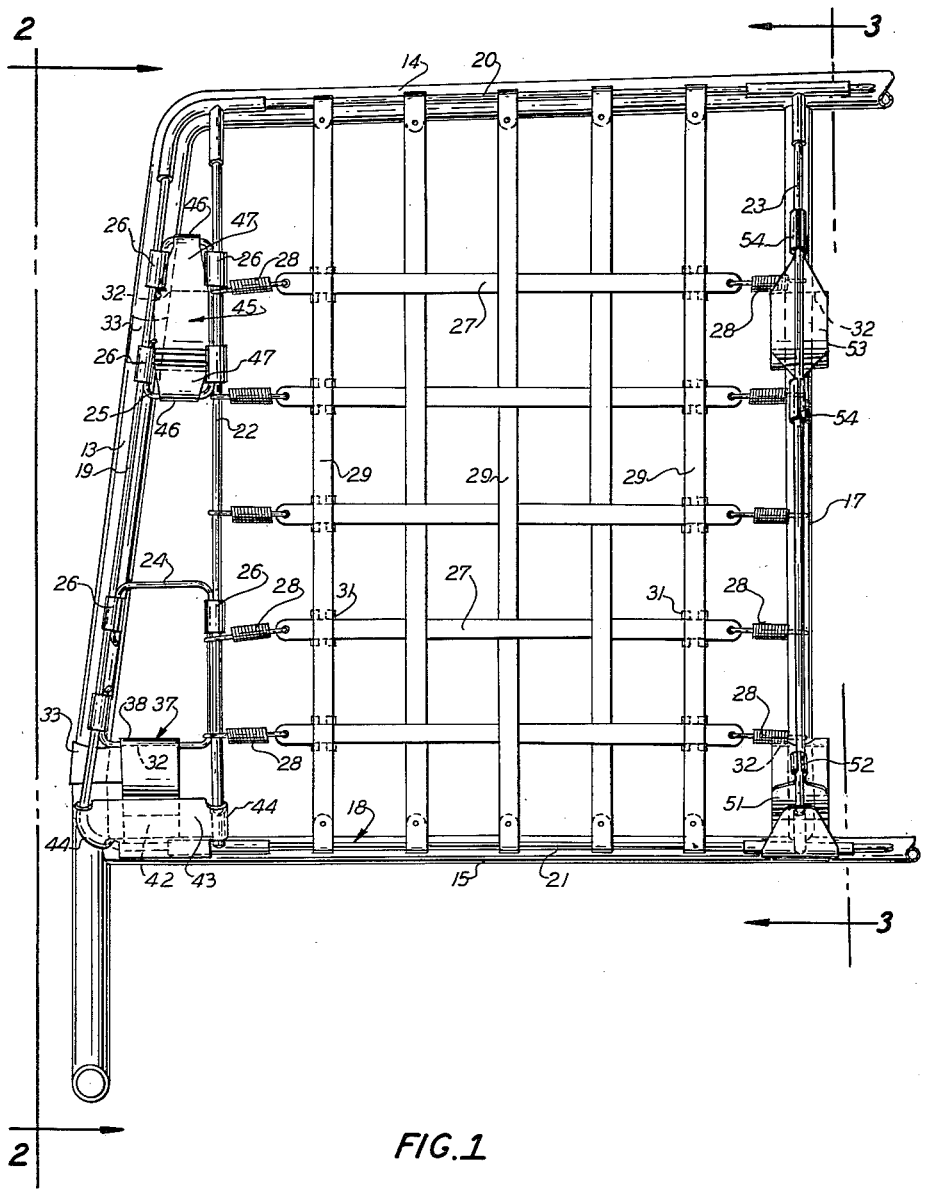
FIG. 1 is a front elevation of a section of a seat back frame constructed in accordance with the present invention.

Referring now to the drawings, there is illustrated a seat back structure comprising a main back frame, generally designated 11, and an auxiliary back frame, generally designated 12. The main frame 11 is illustrated as being of tubular construction and is provided with forwardly bowed rigid side members 13, only one of which is shown, an integral top frame member 14 and a bottom frame member 15. The side frame members 13 are provided with forwardly extending extensions 16 adapted to be connected or mounted on the horizontal seat frame (not shown) in any conventional manner. Extending between the top frame member 14 and the lower frame member 15 are a series of intermediate forwardly extending support members 17, only one of which is shown. The support members are spaced from the side members 13 and each other so that the distance therebetween will comfortably accommodate the width of an average human body.

The auxiliary back frame 12 comprises an outer wire frame 18 substantially complementary in shape to the main frame 11. It is provided with forwardly bowed side members 19 (only one of which is shown), a top member 20 and a bottom member 21 substantially parallel to the top frame member 20. Extending between the top and bottom members are a series of parallel, forwardly bowed inner support members. The first of these inner supports comprises a wire or rod 22 spaced inwardly of side member 19. The second inner support member 23 comprises a wire or rod which overlies the intermediate support member 17. It will be understood that additional support members 22 and 23, the latter corresponding to the number and position of the intermediate support members 17, are appropriately spaced across the auxiliary frame.

Suitable wire or rod braces 24 and 25 are interposed between the side member 19 and the adjacent inner support member 22. As best seen in FIG. 1, the braces 24 and 25 are substantially rectangular in shape and are secured to the side member 19 and to the inner support member 22 by hog rings 26. Transverse back support members 27 formed of spring steel strips extend between the inner support members 22 and 23. The ends of the transverse strips 27 are connected to the adjacent inner support members 22 and 23, respectively, by means of short coil springs 28. The transverse strips are interlaced with generally vertical spring steel strips 29 extending between the top member 20 and the lower or bottom member 21. The ends of the vertical strips are directly fastened to the respective upper and lower members 20 and 21. Suitable clips 31 are provided to maintain the transverse strips 27 in proper vertical spaced relationship on the vertical strips 29. As best seen in FIG. 1, the clips 31 are only used on the vertical strips 29 adjacent the inner support members 22 and 23, respectively.

It will be noted that the forward bowing of the side frame member 13 and the intermediate support member 17 reaches its extremity in a region of the hips of a person on the seat. Correspondingly, the forward bowing of the auxiliary frame side member 19 and the inner support members 22 and 23 also reaches its extremity in the region of the hips. Thus, an over-all convexity from top to bottom of the seat back is produced to provide a resilient but positive support for the small of the back. In addition, the effect of providing interlinked transverse members is the production of a transverse concavity superimposed on the over-all convexity to provide lateral support during transverse accelerations arising during cornering of the vehicle. It will be noted that the outer vertical steel strips 29, the ones adjacent the inner support members 22 and 23, are not interlaced with the transverse members but pass completely over them to institute the concavity evenly over the seat back.

Figure 2:
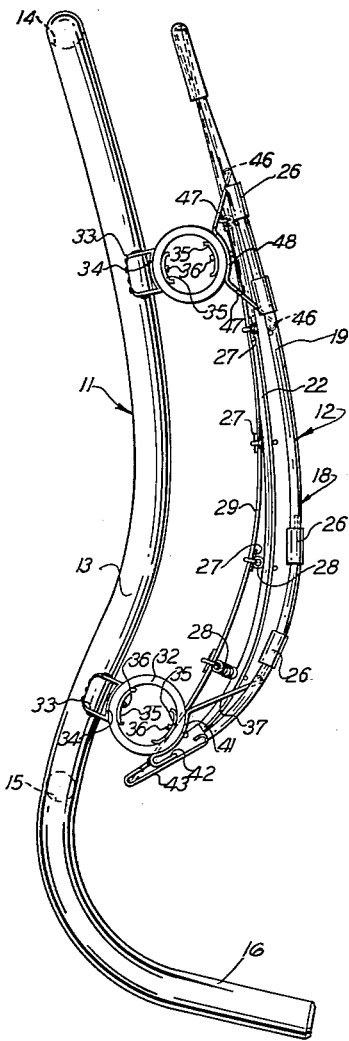
FIG. 2 is an end elevation taken along line 2—2 of FIG. 1.
Figure 3:
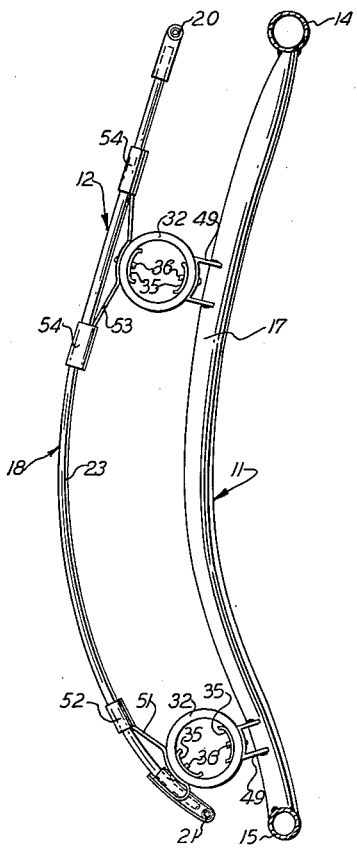
FIG. 3 is a view taken along line 3—3 of FIG. 1.

As best seen in FIGS. 2 and 3, the auxiliary seat frame is maintained in spaced relationship to the main frame by tubular members. The tubular members 32 are cylindrical sections preferably molded of rubber or like resilient material. The tubular members 32 at the left end of the seat back frame, as viewed in FIG. 1, are supported on channel shaped brackets 33 welded or otherwise secured to the side member 13. The brackets 33 are elongated and extend transversely inwardly of the side members 13. The surface 34 of each bracket 33 to which the tubular members 32 are secured is slightly concave so as to be complementary to the curvature of the tubular member. Each tubular member 32 is fastened to the respective bracket 33 by means of a suitable fastening device which is illustrated as being a curved metal retaining strip 35 fitting along the inner side of the cylindrical wall. Each retaining strip 35 is adapted to receive a self-tapping metal screw 36 extending through the bracket 33, the cylindrical wall 32 and then through the retaining strip 35.

The auxiliary frame 12 is attached to the tubular member also through suitable lower and upper brackets. For example, the lower bracket 37 comprises a stamped sheet metal member having a laterally extending coiled portion 38 wrapped around the horizontal or transverse lower leg 39 of the brace 24. As best seen in FIG. 2, the bracket 37 extends toward the main frame side member 13 and then is provided with a concavely curved portion 41 forming a seat for the tubular member 32. The bracket is then reversely curved and provided with a flat portion 42 extending back over the coiled portion, the flat portion 42 being adapted to be welded to a support plate 43 extending between the side frame member 19 and the inner support member 22. The support plate 43 is provided with suitable coiled ears 44 which are wrapped around the corner portion of the side frame member 19, a part of the bottom member 21 and also about the lower end portion of the inner support member 22. A retaining strip 35 and a self-tapping screw 36 secure the bracket 37 to the tubular member.

The upper bracket 45 at the left side of the seat frame comprises a sheet metal member having coiled end portions 46 adapted to fit over the transverse or horizontal legs of the brace 25. As best seen in FIG. 2, the bracket 46 is provided with inwardly depressed sections 47 and a curved center section 48 forming a seat for the tubular member 32. The retaining plate 35 and a self-tapping screw 36 are also used here to retain the bracket to the tubular member.

Substantially the same type of construction arrangement is used for supporting the inner support member 23 in spaced relation to the intermediate support member 17 of the main frame. Short channel shaped sections 49 are provided forming a seat for one side of the tubular members 32 used to resiliently space the inner support member 23 from the main frame intermediate support member 17. The lower bracket 51 attaching the lower end of the inner support member 23 to the tubular member is substantially similar to the lower bracket 37 except that its coiled end portions 52 extend longitudinally of the bracket and are axially wrapped around the inner support member 23. The upper support bracket 53 is a little shorter and flatter than the upper support bracket 45 used to mount the outer end of the auxiliary frame on the outer end of the main frame. The coiled end portions 54 of the upper support bracket 53 extend longitudinally of the support bracket so as to be axially coiled around the inner support member 23.

It will be noted that the axes of the tubular support members 32 extend transversely of the seat back, or in other words, they substantially parallel the upper and lower seat back frame members. Such a support provides vertical resilience so that the seat back may move up and down with the back of the person seated during vertical movements of the vehicle.

It will be understood that the seat back frame as above described will be covered with suitable upholstering material. It will also be understood that the invention is not to be limited to the exact construction shown and described, but that various changes and modifications may be made without departing from the spirit and scope of the invention as defined in the appended claims.

I claim:

1. A seat back for a motor vehicle seat, comprising an auxiliary seat back frame and a main seat back frame, each of said frames consisting of substantially rigid generally vertical side frame members linked by upper and lower transverse frame members, said side frame members being forwardly bowed from said transverse frame members to a point corresponding generally to hip height for a person seated on the seat, said side frame members of said auxiliary frame being linked by a series of transverse resilient back support members whereby a resilient convexity in the region of the small of the back of the person is achieved, and means supporting said auxiliary frame on said main frame in spaced relation thereto, said last mentioned means comprising resilient members interposed between said frames.

2. A seat back for a motor vehicle seat, comprising an auxiliary seat back frame and a main seat back frame, each of said frames consisting of substantially rigid generally vertical side frame members linked by upper and lower transverse frame members, said side frame members being forwardly bowed from said transverse frame members to a point corresponding generally to hip height for a person seated on the seat, said side frame members of said auxiliary frame being linked by a series of transverse resilient back support members whereby a resilient convexity in the region of the small of the back of the person is achieved, and means supporting said auxiliary frame on said main frame in spaced relation thereto, and said upper and lower frame members of said auxiliary frame being linked by a series of vertical resilient back support members interlinked with said transverse resilient back support members whereby a transverse concavity is superimposed on the over-all convexity under the weight of the person reclining against said seat back.

3. A seat back for a motor vehicle seat, comprising an auxiliary seat back frame and a main seat back frame, each of said frames, consisting of substantially rigid generally vertical side frame members linked by upper and lower transverse frame members, said side frame members being forwardly bowed from said transverse frame members to a point corresponding generally to hip height for a person seated on the seat, said side frame members of said auxiliary frame being linked by a series of transverse resilient back support members whereby a resilient convexity in the region of the small of the back of the person is achieved, and means supporting said auxiliary frame on said main frame in spaced relation thereto, and said upper and lower frame members of said auxiliary frame being linked by a series of vertical resilient back support members interlinked with said transverse resilient back support members whereby a transverse concavity is superimposed on the over-all convexity under the weight of the person reclining against the seat back; said transverse and vertical back support members comprising spring steel strips resiliently secured to said side frame members and interlaced with lengths of spring steel strips extending between said upper and lower frame members.

4. A seat back for a motor vehicle seat, comprising an auxiliary seat back frame and a main seat back frame, each of said frames consisting of substantially rigid generally vertical side frame members linked by upper and lower transverse frame members, said side frame members being forwardly bowed from said transverse frame members to a point corresponding generally to hip height for a person seated on the seat, said side frame members of said auxiliary frame being linked by a series of transverse resilient back support members whereby a resilient convexity in the region of the small of the back of the person is achieved, and means supporting said auxiliary frame on said main frame in spaced relation thereto, said last mentioned means comprising tubular resilient members, and bracket means secured to each of said frames, said tubular members being interposed between corresponding pairs of said bracket means, said upper and lower frame members of said auxiliary frame being linked by a series of vertical resilient back support members interlinked with the transverse resilient back support members whereby a transverse concavity is superimposed on the over-all convexity under the weight of the person reclining against said seat back.

5. A seat back for a motor vehicle seat, comprising an auxiliary seat back frame and a main seat back frame, each of said frames consisting of substantially rigid generally vertical side frame members linked by upper and lower transverse frame members, said side frame members being forwardly bowed from said transverse frame members to a point corresponding generally to hip height for a person seated on the seat, said side frame members of said auxiliary frame being linked by a series of transverse resilient back support members whereby a resilient convexity in the region of the small of the back of the person is achieved, and means supporting said auxiliary frame on said main frame in spaced relation thereto, said last mentioned means comprising tubular resilient members, and bracket means secured to each of said frames, said tubular members being interposed between corresponding pairs of said bracket means, said upper and lower frame members of said auxiliary frame being linked by a series of vertical resilient back support members interlinked with said transverse resilient back support members whereby a transverse concavity is superimposed on the over-all convexity under the weight of the person reclining against said seat back, said transverse and vertical back support members comprising spring steel strips resiliently secured to the respective side frame members and interlaced with lengths of spring steel strips extending between the upper and lower frame members.

6. A seat back for a motor vehicle seat comprising an auxiliary seat back frame and a main seat back frame, each of said frames consisting of substantially rigid generally vertical side frame members linked by upper and lower transverse frame members, said side frame members being forwardly bowed from said transverse members to a point corresponding generally to hip height for a person seated on the seat, said side frame members of said auxiliary frame being linked by a series of transverse resilient back support members whereby a resilient convexity in the region of the small of the back of the person is achieved, and means supporting said auxiliary frame on said main frame in spaced relation thereto, and said upper and lower frame members of said auxiliary frame being linked by a series of vertical resilient back support members whereby a transverse concavity is superimposed upon the over-all convexity under the weight of the person reclining against said seat back.

References Cited in the file of this patent
UNITED STATES PATENTS

| | | |
|---|---|---|
| 1,711,255 | Weinman et al. | Apr. 30, 1929 |
| 2,106,066 | Sadgrove | Jan. 18, 1938 |
| 2,203,598 | Nelems | June 4, 1940 |
| 2,616,484 | Christie | Nov. 4, 1952 |
| 2,669,292 | Asaro | Feb. 16, 1954 |

FOREIGN PATENTS

| | | |
|---|---|---|
| 1,031,403 | France | June 23, 1953 |
| 1,127,581 | France | Aug. 13, 1956 |
| 1,139,158 | France | Feb. 4, 1957 |